No. 874,765. PATENTED DEC. 24, 1907.
A. HAMPE.
ATTACHING DEVICE.
APPLICATION FILED FEB. 4, 1907.

WITNESSES:
Charles V. Dwyer
M. Greenbaum

INVENTOR
Adolph Hampe
BY
E. F. Lennert
ATTORNEY

UNITED STATES PATENT OFFICE.

ADOLPH HAMPE, OF NEW YORK, N. Y.

ATTACHING DEVICE.

No. 874,765.

Specification of Letters Patent.

Patented Dec. 24, 1907.

Application filed February 4, 1907. Serial No. 355,599.

*To all whom it may concern:*

Be it known that I, ADOLPH HAMPE, a citizen of the United States, and resident of the city, county, and State of New York, have invented certain new and useful Improvements in Attaching Devices, of which the following is a specification.

My invention relates to an attaching device particularly adapted for supporting stockings or hose and has for its object the production of such a fastener which, while holding the stocking firmly will do so without danger of tearing the material and without danger of becoming accidentally unfastened and thus permitting the stockings to fall down.

In the accompanying drawings, which form part of this specification, the invention is fully shown.
Similar characters of reference indicate similar parts in the several views.

Figure 1:
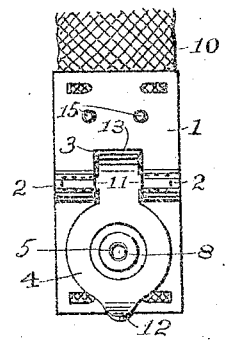
Figure 2:
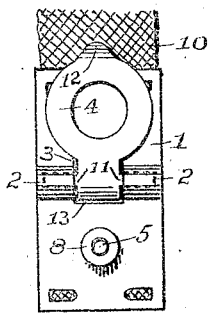
Figures 3, 4:
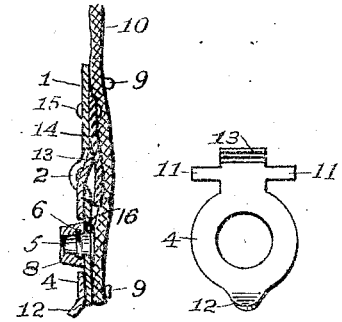
Figure 5:
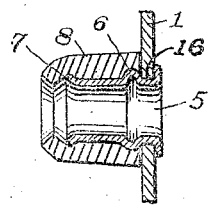

Figure 1 shows a front view of the device the clasp being closed. Fig. 2 is a similar view, the clasp however being open. Fig. 3 is a vertical central sectional view of Fig. 1. Fig. 4 is the clasp removed from the plate or body and Fig. 5 is an enlarged central sectional view of the stud over which the edge of the stocking is passed.
The device is composed of an oblong body or plate 1 of sheet metal. About midway of its length, said plate is struck up to form bearings 2 on both sides of a central opening 3, said bearings extending laterally of and between the edges of the plate in the opening, each of said bearings having an open side. The bearings 2 are adapted to receive the arms 11 of a clasp member 4. By forming the bearings 2 in the manner indicated, the plate 1 can be readily stamped out without the requirement of expensive machinery, while the particular location of the bearings on the plate provide a structure which will prevent the clasp member from being brought into contact with the surface of the flexible support 10 whether said clasp be in open or closed position. At a suitable distance below said opening 3 is secured a stud 5. A cheap and simple method for forming the stud is to pass a so called "eyelet" of proper length and size through an opening 16 formed in the plate 1, from the rear, and upsetting a bead 6 on the front whereby it is firmly seated, thereby providing two spaced flanges to receive the plate, one of the flanges being located intermediate the ends of the eyelet. The front edge 7 of the eyelet may be slightly flared. Over this eyelet a piece of rubber tubing 8 is slipped, the tubing forming a yielding facing for the stud and being a trifle longer than the projecting portion of the eyelet and of a smaller diameter than the periphery of the eyelet, so that when it is placed over the stud, the rubber will be stretched in such manner as to be retained in place on the eyelet, the flared portion of the eyelet aiding in this result. By this construction the entire projecting portion of the eyelet is provided with a yielding facing, which projects beyond the front plane of the eyelet and yielding inwardly over the end of the eyelet under any pressure that may be placed thereon when the clasp member is clamping the stocking in position. There is therefore, no metallic surface of any character which can contact with that portion of the stocking that extends over the stud and which is under the clamping tension, thereby providing a contacting surface which cannot injure the stocking and which is of substantially the same yielding quality throughout the surface of the stud. Furthermore such surface is of a non-slipping character, the projecting portion of the facing permitting the stocking to conform to any pulling strains placed thereon without appreciably affecting the material of the stocking, thereby preventing any liability of the stocking being torn by such pulling strains.

Near each corner of the plate 1 a finger or barb 9 is sheared and so bent as to stand towards the back of the plate and at right angles thereto. These four fingers are passed through and bent over the tape or elastic band 10 from which the supporter hangs. This tape extends down along the inner side or back of plate—as shown in Fig. 3—so that no metal (excepting that formed by the exposed portions of the barbs or fingers 9) touches the flesh or underclothing. In Fig. 3 the upper finger is shown passing through the tape before it is bent; the lower finger in the same figure is shown bent over the material.

The clasp 4 is provided with two integral arms 11 which are located in the bearings 2 as shown. Below these arms the body is substantially an annular washer having a central opening which surrounds the stud 5 when the clasp is down. An outwardly bent extension 12 permits easy manipulation for opening or closing the clasp. Above the two arms the clasp has an extension 13 which is spring pressed in an opened or closed position by a separate flat spring 14 fastened to the plate by rivets 15 located on the opposite side of the bearings 2 from the stud 5. By thus mounting the spring 14 the parts are not only so arranged as to prevent the formation of an excessive thickness at any particular portion of the plate, but the particular arrangement shown provides, that the clasp member when in a clamping position has its extension 13 projecting toward the point of connection of the spring and plate and therefore under a greater retaining tension than when the member is in its opposite position, in which latter case the extension is in contact with the spring at the point of greatest distance from the point of connection of the spring and plate. This latter feature is of advantage in view of the fact that the bearings for the clasp member are open-sided on their rear, so that the spring forms the sole portion of the structure which retains the arms 11 in contact with the bearings. Therefore, any tendency of the clasp member to be pushed inward at the point where the arms 11 are located, would be resisted by the contact of the extension 13 with the spring at a point sufficiently close to the point of connection of the spring and plate to provide a maximum support for the clasp member.

Such being the construction, the operation is as follows: When all the parts are assembled as described, the clasp is raised and the edge of the stocking is passed over the stud 5 when the clasp is folded down. The spring presses against the extension of the clasp and holds the stocking firmly in place over and around the rubber covered stud which by reason of its adhering or nonslipping properties prevents the stocking from pulling out. When it is desired to remove the device from a stocking, the clasp is raised above or beyond the center and the spring will press against the extension and hold it open.

I find in practice when a spring is integral with the plate, it soon loses its resiliency, and is impractical because, if the metal is hard—as it must be to be of spring temper—then you cannot form fingers or ears from it as they will break off short, therefore I prefer a separate spring of good temper because upon it depends the success or failure of the device to operate.

Such being my invention what I claim is:—

1. In an attaching device, a rectangular plate having an opening approximately midway of the length of the plate, and also having struck-up portions extending laterally of the plate and from the edges of the plate to the opening, said struck-up portions forming bearings having an open side, a stud on one side of said plate, said stud being spaced from said opening, a clasp member having laterally extending arms adapted to rest within the bearings of the plate, said member having an opening to receive the stud when the member is in one position, and also having an extension adjacent said arms, and a spring member secured to the opposite side of the plate from the stud, the point of securing of the spring member and the stud being on opposite sides of the opening in the plate, said spring member having a bearing contact on the extension of the clasp member to retain the latter in either an open or closed position.

2. In an attaching device, a flexible support, a plate secured thereto, a clasp member pivotally secured to said plate said member having an opening, a stud secured to said plate and adapted to be received within said opening, said stud comprising a metallic support and a yielding facing therefor, said facing extending beyond the front plane of the metallic support to prevent contact of a stocking with the metallic support.

3. In an attaching device, a flexible support, a plate secured thereto, a clasp member pivotally secured to said plate, said member having an opening, a stud secured to said plate and adapted to be received within said opening, said stud comprising a metallic eyelet secured to the plate and having a projecting portion, and a rubber facing for the outer periphery of the eyelet, said facing extending beyond the plane of the projecting portion of the eyelet and preventing contact of a stocking with the eyelet.

4. A stud for attaching devices comprising an eyelet having spaced flanges adapted to receive a plate therebetween, one of said flanges being located intermediate the ends of the eyelet, the free end of the eyelet being flared, and a cylindrical rubber facing for the eyelet, said facing being in the form of a tube and of a length greater than the length of the projecting portion of the eyelet to provide a yielding surface projecting beyond the plane of the flared end of the eyelet, whereby the material to be clamped is held from contact with the eyelet portion of the stud.

Signed at New York city in the county of New York and State of New York this first day of February A. D. 1907.

ADOLPH HAMPE.

Witnesses:
CHARLES V. DWYER,
EDGAR M. GREENBAUM.